United States Patent [19]

Fawley

[11] 4,205,937
[45] Jun. 3, 1980

[54] CARRIER FOR COMPRESSED GAS CYLINDERS

[76] Inventor: Norman C. Fawley, 255 Rafael Walk, Long Beach, Calif. 90803

[21] Appl. No.: 904,803

[22] Filed: May 11, 1978

Related U.S. Application Data

[63] Continuation-in-part of Ser. No. 765,418, Feb. 3, 1977, Pat. No. 4,098,416.

[51] Int. Cl.² ............................................. B62B 1/06
[52] U.S. Cl. ........................................ 414/457; 222/3; 280/47.19; 280/47.2; 414/448
[58] Field of Search ........................ 414/448, 453–457; 222/3, 153, 180, 182; 220/3; 280/47.13 R, 47.17, 47.19, 47.2

[56] References Cited

U.S. PATENT DOCUMENTS

| | | | |
|---|---|---|---|
| 1,517,901 | 12/1924 | Gill | 414/457 |
| 1,913,295 | 6/1933 | Schreck | 414/456 |
| 2,684,180 | 7/1954 | Allen | 220/3 X |
| 2,739,721 | 3/1956 | Blouin | 414/448 |

Primary Examiner—Robert G. Sheridan

[57] ABSTRACT

A carrier for one or more compressed gas cylinders each having a portion, the under side of which is arranged to receive a supporting hook, the carrier having a frame approximating the height of the cylinder and including a hook near its upper end, the frame being tiltable in one direction with respect to the cylinder for insertion of the hook under the hook receiving portion; the side of the frame opposite from the cylinder having carrier wheels, whereby, upon tilting of the frame in the opposite direction, the hook is raised to support the cylinder in contact with the frame; the frame is provided with a safety bail or retainer loop movable over the cylinder and engagable therewith to provide a second retainer for the cylinder.

One embodiment has tilt aiding wheels at the bottom of the frame to provide rolling support for the frame on movement of the frame into position for engagement with the hook receiving portion cooperate with the carrier wheels to effect rolling support for the cylinder as well as load distribution and balance.

6 Claims, 11 Drawing Figures

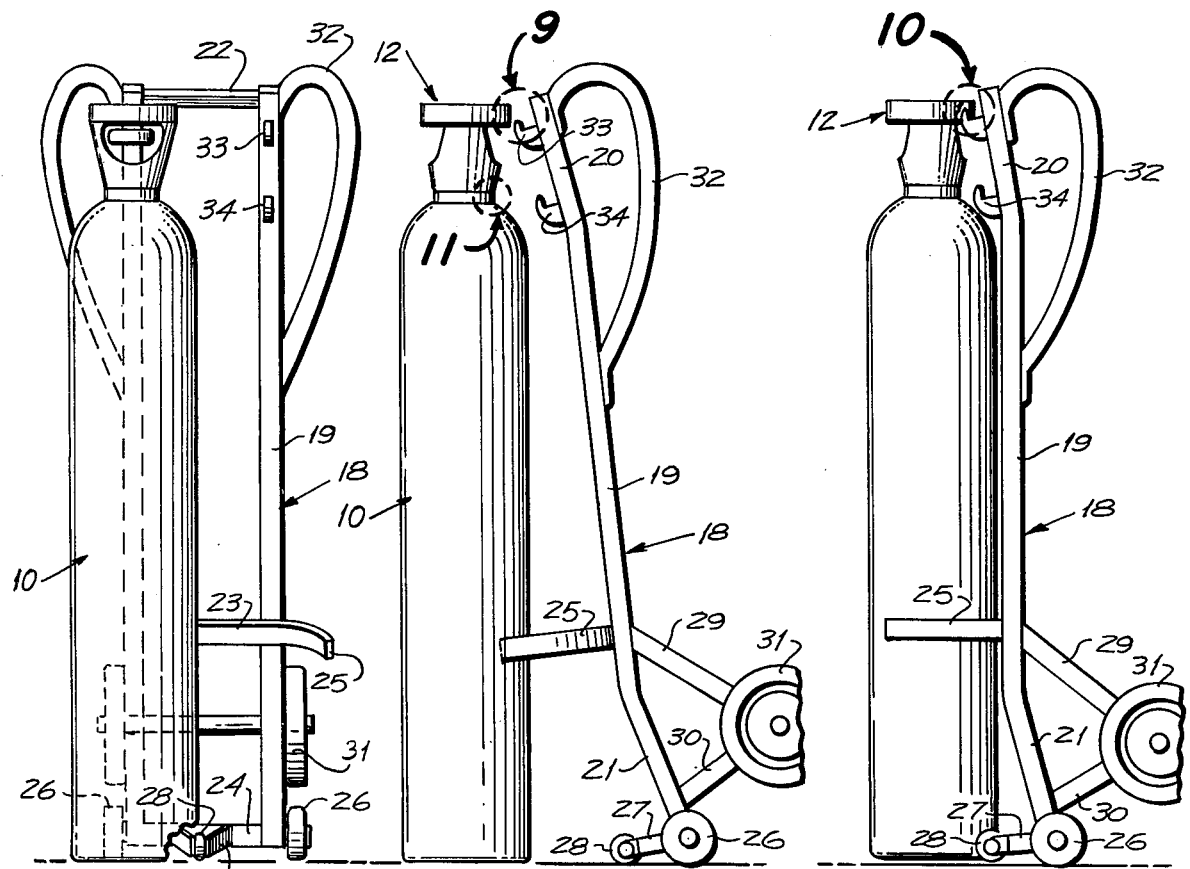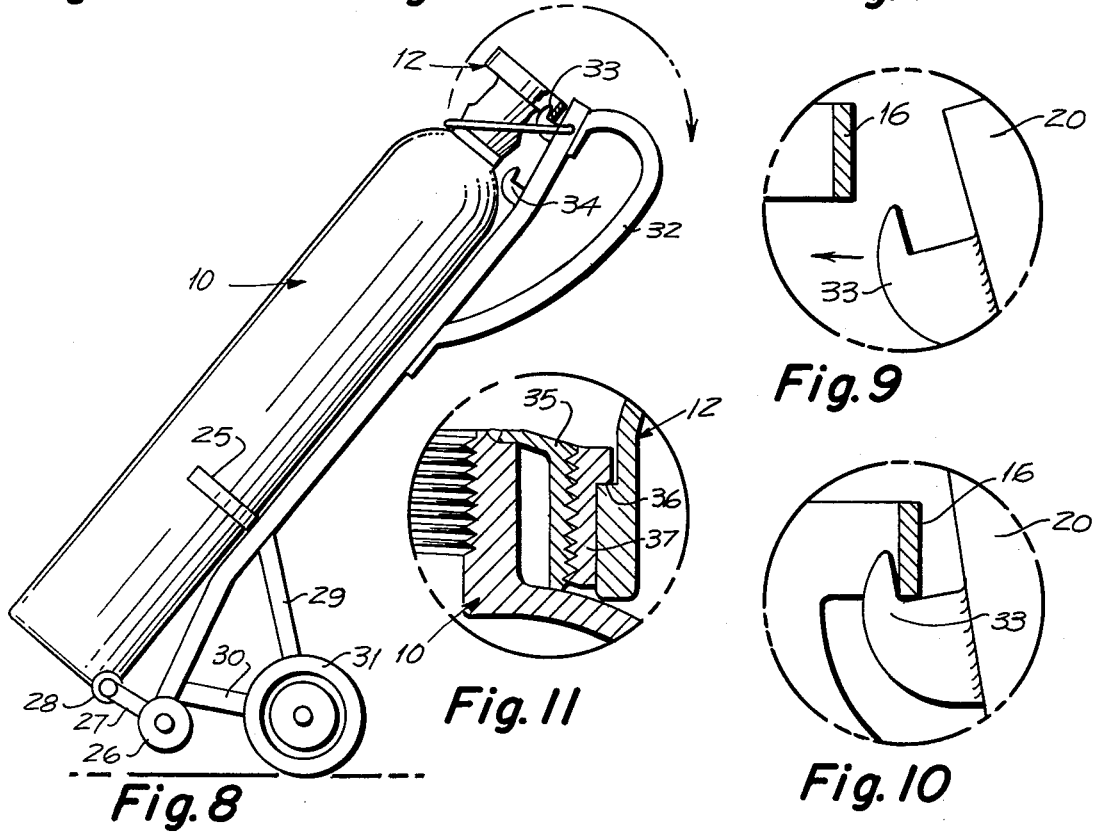

CARRIER FOR COMPRESSED GAS CYLINDERS

This application is a continuation-in-part of copending application Ser. No. 765,418, filed Feb. 3, 1977, now U.S. Pat. No. 4,098,416.

BACKGROUND

The traditional method of moving compressed gas cylinders which can weigh up to 300 pounds each has been to manually tilt the cylinder and roll the cylinder about its lower end.

When the cylinder is rolled by hand, the cylinder is loosely held at its upper end by one hand while the operator uses his other hand or foot to roll the cylinder. While manual rolling is fairly easy if the operator is experienced, one can easily cause the cylinder to fall, possibly damaging or breaking off the valve.

An alterative method of moving compressed gas cylinders is to use a conventional hand truck having a supporting plate or foot. When using a conventional hand truck with a supporting plate, it is necessary to tilt the cylinder backwards with one hand while forcing the supporting plate under the cylinder. This is usually done with the operator's foot while steadying the hand truck with his other hand. The hand truck is then tipped backwards and at the same time the cylinder must also be tipped backwards in order to lift the cylinder for transport.

If the operator wishes to transport more than one cylinder at a time, he must balance the first cylinder while manipulating the hand truck and second cylinder. If three cylinders are to be transported, placement of the third cylinder is more complicated with increased danger that one or more cylinders may fall, damaging the cylinder or injuring the operator, both when loading and when transporting the cylinders. To prevent the cylinders from falling during transport, a chain or belt is usually secured about the hand truck and cylinders.

Another problem inherent with the conventional hand truck and its supporting plate is that it is customary to store the cylinders such as on a loading dock in closely stacked relation in order to save space and provide mutual support between the cylinders; consequently, it is necessary to manually separate each cylinder from the stack in order to place it on the hand truck, or to manipulate each cylinder when moving it from the hand truck back to a stack.

Because of substantial manual handling of the compressed gas cylinders, which are quite heavy, there is substantial danger of injury to the operator's fingers or hands if the cylinders are forced toward each other when the operator's hands or fingers are between the cylinders. There is also the possibility of injury to the operator's feet or ankles or back from reaching and straining when in an awkward position.

SUMMARY

The present invention is directed to a carrier for compressed gas cylinders which is summarized in the following objects:

First, to provide a carrier for compressed gas cylinders which materially reduces the need for manually handling of the cylinders in order to secure the cylinders to the carrier or separate the cylinders from the carrier even though the cylinders are removed from or returned to a closely stacked group of cylinders.

Second, to provide a carrier as indicated in the preceding object wherein the carrier is provided with wheels at its lower end and novelly arranged hook elements at its upper end engagable with the upper ends of closely stacked cylinders without requiring movement of the cylinders other than tilting the cylinders for engagement by the carrier for transport.

Third, to provide a carrier for compressed gas cylinders which is provided with fixed hook elements particularly arranged for compressed gas cylinders having valve protectors, such as is disclosed in U.S. Pat. No. 3,776,412, which has perforations into which the fixed hook elements may be inserted by manipulation of the carrier. The hook arrangement, because of the method of attachment and the weight of the cylinders, provides an extremely secure method of transporting compressed gas cylinders.

Fourth, to provide a carrier for compressed gas cylinders which includes two sets of novelly arranged wheels at the lower end of the carrier frame so positioned as to provide rolling support for one or more gas cylinders and relieve the operator from supporting part of the weight.

Fifth, to provide a carrier for compressed gas cylinders which includes a novelly arranged set of wheels including a pair of wheels and a forwardly positioned wheel between the pair of wheels to aid in guiding the carrier hook into engagement with the gas cylinder.

BRIEF DESCRIPTION OF THE FIGURES

FIGS. 1 through 4 illustrate one embodiment of the carrier for compressed gas cylinders, in which:

FIG. 1 is a side view wherein the compressed gas cylinder is shown in its vertical position resting on an underlying surface.

FIG. 2 is a similar side view showing the compressed gas cylinder in its suspended condition.

FIG. 3 is an enlarged view taken within circle 3 of FIG. 1.

FIG. 4 is a view similar to FIG. 3 showing the hook arrangement as arranged to carry alternatively a larger size and a smaller size of the compressed gas cylinder.

FIGS. 5 through 10 illustrate another embodiment of the carrier for compressed gas cylinders, in which:

FIG. 5 is a front view of the carrier with a single cylinder shown in position.

FIG. 6 is a side view showing the carrier in position for a movement into engagement with the valve protector provided at the top of the cylinder.

FIG. 7 is another side view showing the carrier in engagement with the valve protector.

FIG. 8 is another side view showing the carrier tilted for support on a pair of wheels for the purpose of transporting the cylinder.

FIG. 9 is an enlarged view taken within circle 9 of FIG. 6.

FIG. 10 is an enlarged fragmentary view taken within circle 10 of FIG. 7.

FIG. 11 is an enlarged fragmentary view taken within circle 11 of FIG. 6.

DETAILED DESCRIPTION

Figure 1:
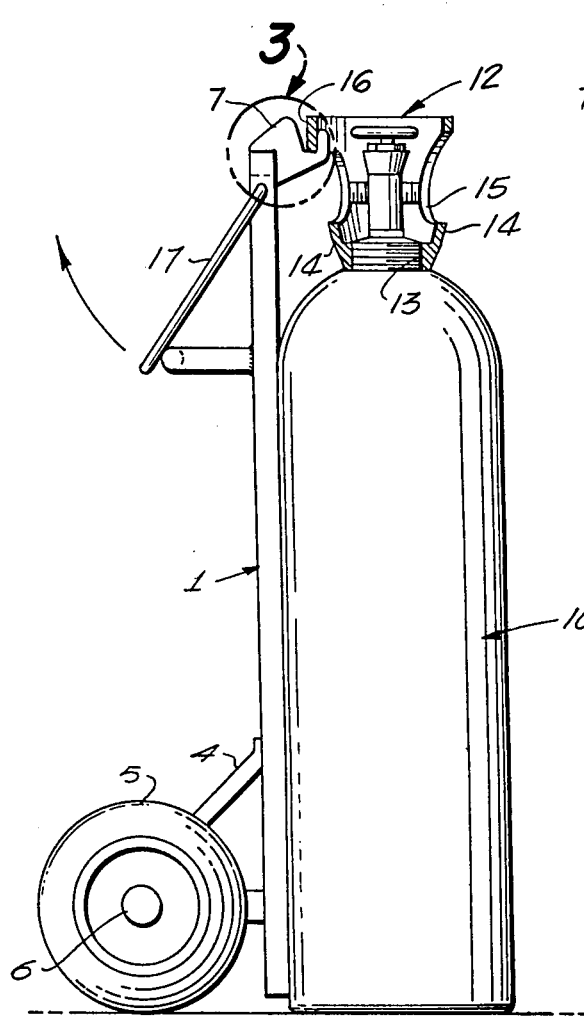
Figure 2:
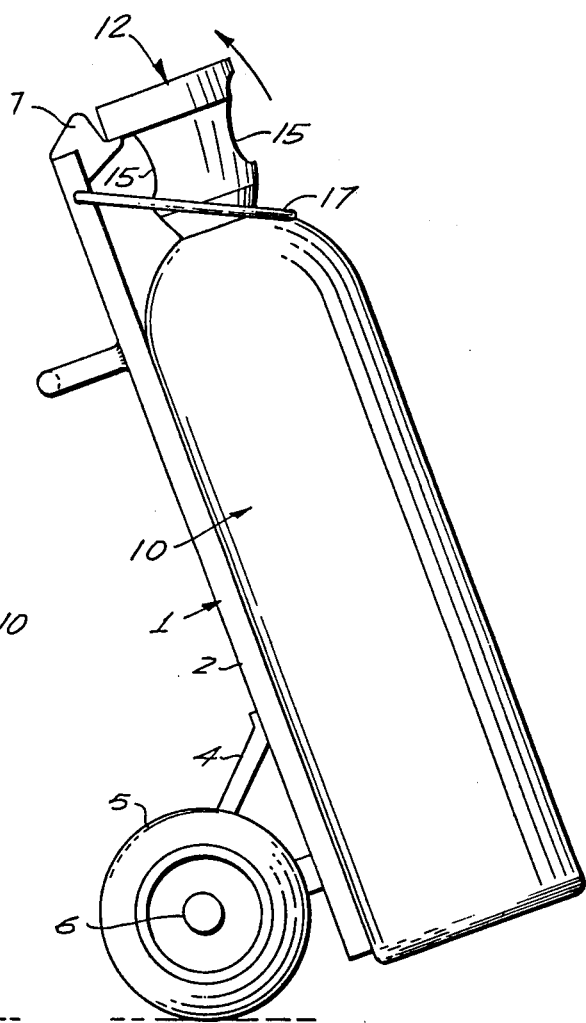
Figure 3:
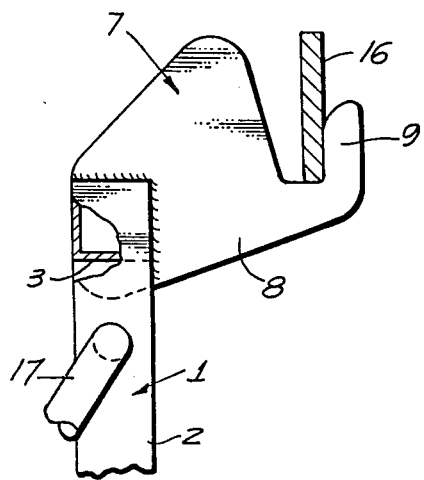

Referring first to FIGS. 1 through 4, the embodiment here illustrated includes a rectangular frame structure 1 having vertical side bars 2 and cross bars 3. Extending rearwardly from the lower portion of the frame structure is a pair of wheel brackets 4 which support a pair of wheels 5 on a common shaft 6.

Figure 4:
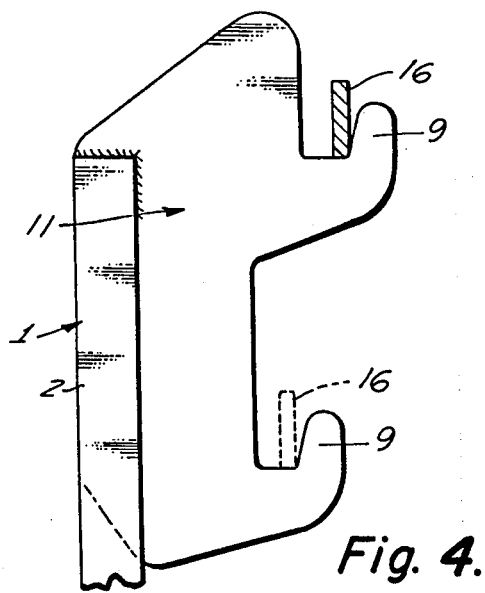

Welded to and extending upwardly from the upper cross bar of the frame structure is a pair of hook elements 7, each having a hook arm 8 terminating in an upturned hook 9. If the carrier is intended to handle only one size of compressed gas cylinders 10, a pair of the single hook elements 7 is sufficient. If two sizes of compressed gas cylinders are to be carrier, a set of three dual hook elements 11 having upturned hooks 9 may be provided as indicated in FIG. 4.

This construction is particularly adapted for compressed gas cylinders 10 which utilize a valve protector more fully disclosed in U.S. Pat. No. 3,776,412, and herein designated 12. The valve protector 12 includes a screwthreaded base 13 joined to upwardly diverging side walls 14 having a pair of opposed access openings 15. At least one of the openings terminates below the upper end of the valve protector so as to provide a cross portion 16 accessible to the hook elements through the corresponding opening.

Operation of this embodiment is as follows:

The frame structure may be wheeled up to the compressed gas cylinder 10 as shown in FIG. 1. The frame structure 1 when in a vertical position clears the underlying surface of the cross portion 16 a sufficient amount that the upper end of the frame structure may be tilted forwardly so as to guide the hook elements 7 or 11 into an access opening 15 and under the corresponding cross portion 16 whereupon the upper portion of the frame structure is tilted backwardly causing the compressed gas cylinder to be suspended from a corresponding hook element 7 or 11. Once this is accomplished, the compressed gas cylinder is ready for transportation by the wheels while in a suspended condition from the corresponding hook.

To provide increased safety while transporting the cylinder, a retainer loop or safety bail 17 may be provided; its main function being to limit tilting of the cylinders away from the carrier before engagement with the hooks or to prevent the cylinders from tipping forwardly when the carrier hooks are disengaged.

Referring to the embodiment shown in FIGS. 5 through 11, this embodiment includes a frame structure 18 having vertical bars 19 which include forwardly upper portions 20 and rearwardly tilted lower portions 21. The vertical bars 19 are joined by a top cross bar 22, an intermediate cross bar 23 and a bottom cross bar 24. The intermediate cross bar 23 is joined at its lateral extremities to a pair of forwardly and laterally curved retainer arms 25.

The lower extremities of the vertical bars 19 are provided with end wheels 26 so that the frame structure 18 may be tilted about an axis passing through the lower extremity thereof. The bottom cross bar 24 is provided with forwardly directed mounting arms 27 which converge toward the center of the frame structure 18 and support a forwardly disposed wheel 28.

Extending from the rearward side of the frame structure 18 is a pair of converging mounting arms 29 and 30 which carry a pair of rear wheels 31, the axis of which is disposed above the bottom portion of the frame structure as well as rearwardly thereof. The vertical bars 19 are provided at their upper portions with a pair of handle loops 32 extending rearwardly of the frame structure 18. Each vertical bar 19 is provided adjacent its upper end with a forwardly directed upper hook member 33 and in a lower position with a second hook member 34.

The carrier shown in FIGS. 5 through 11 is intended to pick up and carry a cylinder 10 having a valve protector 12 corresponding to the cylinder 10 and valve protector 12 shown in the first embodiment, FIGS. 1 through 4. As it is desirable to arrange the valve protector so that it may be rotated to place the opening 15 in position for engagement with the hook 7, the end of the cylinder 10 may have an externally screwthreaded collar 35 suitably secured thereto. Referring to FIG. 11, the lower end of the protector is provided with an upwardly facing shoulder 36 and interposed between the collar 35 and protector is a removable internally screwthreaded collar 37 having a flange 38 engagable with the shoulder 36.

Operation of the carrier as shown in FIGS. 5 through 11 is as follows:

When the end wheels 26 and forwardly disposed wheels 28 are both in contact with an underlying surface as shown in FIGS. 5 and 6, the frame structure 18 is supported in a forwardly tilting position sufficient to place the hook member 33 slightly below the cross portion 16 of the valve protector 12 as shown in FIG. 9. Rolling movement of the frame structure 18 on the wheels 26 and 28 positions the hook under the cross portion 16 whereupon the frame structure may be tilted towards a vertical position causing the wheel 28 to clear the underlying surface and raise the hook 33 into engagement with the cross portion 16 as shown in FIG. 10. The frame structure 18 may now be tilted backward to the position shown in FIG. 8 so that the frame structure and cylinder 10 are supported by the rear wheels 31. If the frame structure is tilted as shown in FIG. 8, the end wheels 26 are raised; however, the frame structure 18 and cylinder 10 may be supported and balanced with both the wheels 26 and 31 in rolling contact with an underlying surface minimizing the force required by the operator to transport the cylinder. If a shorter cylinder is used, the lower hook member 34 is used in the same manner as the upper hook member 33.

Having fully described my invention, it is to be understood that I am not to be limited to the details herein set forth, but that my invention is of the full scope of the appended claims.

I claim:

1. A carrier for a compressed gas cylinder having at its upper end a laterally accessible upwardly directed hook receiving opening, the carrier comprising:
   a. a frame structure dimensioned to be placed along side a free standing cylinder and having at its upper portion an upwardly directed hook element to be received in said opening;
   b. a set of wheels for supporting the frame structure defining forward and rearward axes for positioning the frame structure at an essentially upright position for movement over an underlying surface toward a free standing cylinder to position the hook element for entrance into a corresponding opening; the frame structure being pivotable about the rearward wheel axis toward a position in contact with the cylinder while causing the hook element to be retained in said opening;
   c. the frame structure being manually tiltable about the rearward wheel axis while in contact with the cylinder causing the hook element to raise the cylinder for transportation.

2. A carrier, as defined in claim 1, wherein:
   a. a second set of wheels is carried by the frame structure, rearwardly of the first set of wheels, for engagement with the underlying surface and positioned to raise and tilt the frame structure until the first set of wheels clear the underlying surface and the center of gravity of the cylinder and frame structure is in essentially perpendicular relation to the second set of wheels.

A carrier, as defined in claim 1, wherein:
the frame structure includes a pair of cylinder receivingg portions;
a pair of hook elements are provided; and
the set of wheels includes a forward wheel located between the pair of cylindrical receiving portions to clear juxtapositioned free standing cylinders positioned therein.

A carrier for fluid receiving cylinders, each having ·ally accessible suspension means near its upper end, carrier comprising:
a frame structure dimensioned to be positioned contiguous to at least one free standing cylinder;
a hook element for supportive engagement by the suspension means of each cylinder;
a forward wheel, a pair of intermediate wheel and a pair of rearward wheels carried at the lower end of the frame structure;
the forward and intermediate wheels defining a supporting plane disposing the frame structure at an upright position wherein the hook element is received in the suspension means while the cylinder remains in a free standing position;
the frame structure being pivotable about the intermediate wheels to bring the hook element and frame structure into supportive relation to the cylinder;

f. the rearward wheels assuming supportive relation to the frame structure and cylinder upon further pivotal movement of the frame structure.

5. A carrier for fluid receiving cylinders, comprising:
 a. a carrier collar for the cylinder, including a hook receiving means accessible from its under side;
 b. a frame structure dimensioned to be placed alongside a cylinder free standing on an underlying surface and having at its upper portion a hook element movable upwardly for reception in the hook receiving means;
 c. a forward, an intermediate and a rearward wheel means carried by the frame structure;
 d. the forward wheel means being guidable on the underlying surface to cause the frame structure to direct the hook element under the hook receiving means;
 e. the intermediate wheel means being guidable on the underlying surface to cause the frame structure to pivot and raise the hook element into the hook receiving means for support of the cylinder by the frame structure;
 f. the frame structure being pivotable about the intermediate wheel means to tilt the cylinder while supported by the frame structure;
 g. the rearward wheel means being movable into rolling engagement with the underlying surface and disposed by the frame structure in a position underlying approximately the center of gravity of the cylinder for transporting the cylinder.

6. A carrier, as defined in claim 5 wherein:
 a. the hook receiving means includes means for effecting adjustment to facilitate receipt of the hook element without disturbing the freestanding condition of the cylinder.

* * * * *